(12) United States Patent
Sullivan et al.

(10) Patent No.: US 10,882,177 B2
(45) Date of Patent: Jan. 5, 2021

(54) PEGBOARD BRACKET

(71) Applicant: Brennan Equipment and Manufacturing, Inc., University Park, IL (US)

(72) Inventors: Peter Sullivan, Frankfort, IL (US); Kyle Graben, New Lenox, IL (US)

(73) Assignee: Brennan Equipment and Manufacturing, Inc., University Park, IL (US)

( * ) Notice: Subject to any disclaimer, the term of this patent is extended or adjusted under 35 U.S.C. 154(b) by 142 days.

(21) Appl. No.: 16/031,064

(22) Filed: Jul. 10, 2018

(65) Prior Publication Data
US 2019/0030706 A1    Jan. 31, 2019

Related U.S. Application Data

(60) Provisional application No. 62/538,776, filed on Jul. 30, 2017.

(51) Int. Cl.
| | |
|---|---|
| *B25H 3/04* | (2006.01) |
| *F16B 5/00* | (2006.01) |
| *F16M 13/02* | (2006.01) |
| *B25H 1/02* | (2006.01) |
| *F16B 5/06* | (2006.01) |

(52) U.S. Cl.
CPC .............. *B25H 3/04* (2013.01); *B25H 1/02* (2013.01); *F16B 5/0084* (2013.01); *F16M 13/02* (2013.01); *F16B 5/0614* (2013.01); *F16B 5/0635* (2013.01)

(58) Field of Classification Search
CPC . B25H 1/02; B25H 3/04; F16B 5/0084; F16B 5/0614; F16B 5/0635; F16M 13/02
USPC ................................................ 108/59–61, 28
See application file for complete search history.

(56) References Cited

U.S. PATENT DOCUMENTS

| | | | | |
|---|---|---|---|---|
| 682,621 | A * | 9/1901 | Humphrey | |
| 891,604 | A * | 6/1908 | Diamond | |
| 1,209,032 | A * | 12/1916 | Richens | A47G 1/10 403/402 |
| 2,168,911 | A * | 8/1939 | Meyer | A47F 5/005 403/205 |
| 3,389,666 | A * | 6/1968 | Schultze-Bonatz | A47B 47/042 108/17 |
| 3,556,023 | A * | 1/1971 | Marschak | A47B 57/045 108/1 |
| 3,846,002 | A * | 11/1974 | Floetotto | A47B 47/04 312/107 |
| 3,854,268 | A * | 12/1974 | Gutner | F16B 12/50 403/403 |
| 4,024,691 | A * | 5/1977 | Hansen | E06B 3/9645 52/656.9 |

(Continued)

Primary Examiner — Daniel J Troy
Assistant Examiner — Timothy M Ayres
(74) Attorney, Agent, or Firm — Seyfarth Shaw LLP

(57) ABSTRACT

Disclosed is a bracket that couples a pegboard to a table without requiring a separate table for a stand-alone table and a pegboard-coupled table. The bracket can include vertical and horizontal portions that couple to a pegboard and table, respectively. The bracket can further include tabs that grip the table or pegboard for additional support. The bracket therefore allows for a pegboard to be attached to a table, or for the table to be sold without the pegboard, therefore freeing substantial inventory for the seller of the table and pegboard combination.

3 Claims, 4 Drawing Sheets

(56) References Cited

U.S. PATENT DOCUMENTS

| | | | | |
|---|---|---|---|---|
| 4,068,967 | A * | 1/1978 | Hoodis | A47G 1/105 403/402 |
| 4,095,915 | A * | 6/1978 | Druell | A47G 1/06 40/784 |
| 4,165,088 | A * | 8/1979 | Nelson | B62B 3/02 280/47.35 |
| D259,083 | S * | 5/1981 | Riegsecker | D8/382 |
| 4,283,900 | A * | 8/1981 | Schubert | E04B 1/2604 403/402 |
| 4,318,628 | A * | 3/1982 | Mancini | A47B 47/0033 403/231 |
| 5,094,352 | A * | 3/1992 | Green, Sr. | A47J 47/16 211/186 |
| 5,435,728 | A * | 7/1995 | Fula | A63H 33/12 312/213 |
| 5,579,595 | A * | 12/1996 | Dutton | B44D 3/185 160/381 |
| 5,623,881 | A * | 4/1997 | Huang | A47B 21/00 108/102 |
| 5,855,073 | A * | 1/1999 | Boelling | A47B 96/061 248/235 |
| 6,364,263 | B1 * | 4/2002 | Ryan | A47B 96/06 248/239 |
| 6,945,615 | B1 * | 9/2005 | Cain | B25H 3/028 312/249.8 |
| 7,350,549 | B2 * | 4/2008 | Carter | B25H 1/02 144/285 |
| 8,172,098 | B2 * | 5/2012 | Eustace | A47B 47/021 211/189 |
| 8,720,839 | B2 * | 5/2014 | Lijesnic | A47B 47/0033 248/300 |
| 8,826,829 | B2 * | 9/2014 | Taylor | A47C 9/06 108/34 |
| 10,085,554 | B2 * | 10/2018 | Schooley, Jr. | G07C 9/37 |
| 10,357,102 | B2 * | 7/2019 | Kassanoff | A47B 13/02 |

* cited by examiner

PEGBOARD BRACKET

TECHNICAL FIELD OF THE INVENTION

The present application relates generally to brackets. More particularly, the present application relates to a pegboard bracket that couples a pegboard to a table top.

BACKGROUND OF THE INVENTION

Work tables are a common and convenient element of a workshop, whether for a professional or do-it-yourself ("DIY") handyman. Work tables help organize tools and provide a durable surface to assemble objects and fasteners, cut material, operate on objects with tools, and other activities.

Many work tables include pegboards at the rear of the table. For example, a pegboard can include holes that receive organizational attachments such as hooks or other holders of tools. The pegboard provides a durable and easily customized arrangement so the user can arrange his or her tools and other components in a specific configuration.

Current pegboard work tables include a pegboard permanently attached to the table by a weld or other permanent connection structure, such that a separate table must be made for the pegboard and non-pegboard options. A company offering tables with and without a pegboard must therefore maintain two separate tables in inventory rather than allowing one table to either be fit with a pegboard or sold without a pegboard, depending on the customer's preference.

SUMMARY OF THE INVENTION

The presently disclosed embodiments include a bracket that allows a pegboard to be attached to a table without requiring a separate product for a stand-alone table option versus a pegboard table option. The bracket can include vertical and horizontal portions that couple to a pegboard and table, respectively. The bracket can also include tabs that grip the table or pegboard to more generally couple these elements together without requiring a specific structure in the table other than a size that would fit the spacing of the bracket. The bracket therefore allows for a pegboard to be coupled to a table, or for the table to be sold without the pegboard, therefore freeing substantial inventory by allowing a single table for both the pegboard and non-pegboard option.

For example, the presently disclosed embodiments broadly include a bracket including a vertical portion having a vertical base and a vertical attachment portion extending perpendicular to the vertical base. The vertical attachment portion is coupled to a pegboard and at least partially surrounds the pegboard on two sides with the vertical base. The bracket can further include a horizontal portion extending perpendicular to the vertical portion and having a horizontal attachment portion and at least one tab extending from the horizontal attachment portion and bending to grip a table.

The presently disclosed embodiments further include a combination including a bracket having a vertical portion with a vertical base and a vertical attachment portion extending perpendicular to the vertical base, and a horizontal portion extending perpendicular to the vertical portion and having a horizontal attachment portion and at least one tab extending from the horizontal attachment portion. Further included are a pegboard coupled to the vertical portion. The vertical attachment portion and vertical base at least partially surround the pegboard on two sides. Also included is a tabletop, where the tabs are deformed to grip the tabletop.

Further, the presently disclosed embodiments include a method of assembling a bracket to a pegboard and tabletop including providing bracket having a vertical portion, a horizontal portion, a vertical base, and tabs, forming openings in one of the horizontal and vertical portions, coupling the pegboard to one of the vertical or horizontal portions by inserting the pegboard against the vertical base or the tabs, coupling the tabletop to the other of the vertical or horizontal portions by inserting the tabletop against the other of the vertical base or the tabs, deforming the vertical base to be perpendicular to vertical portion, deforming the tabs to be perpendicular to the one of the horizontal and vertical portions that the tabs are coupled to, and inserting fasteners through the openings to couple at least one of the one of the horizontal or vertical portions to at least one of the pegboard or tabletop.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
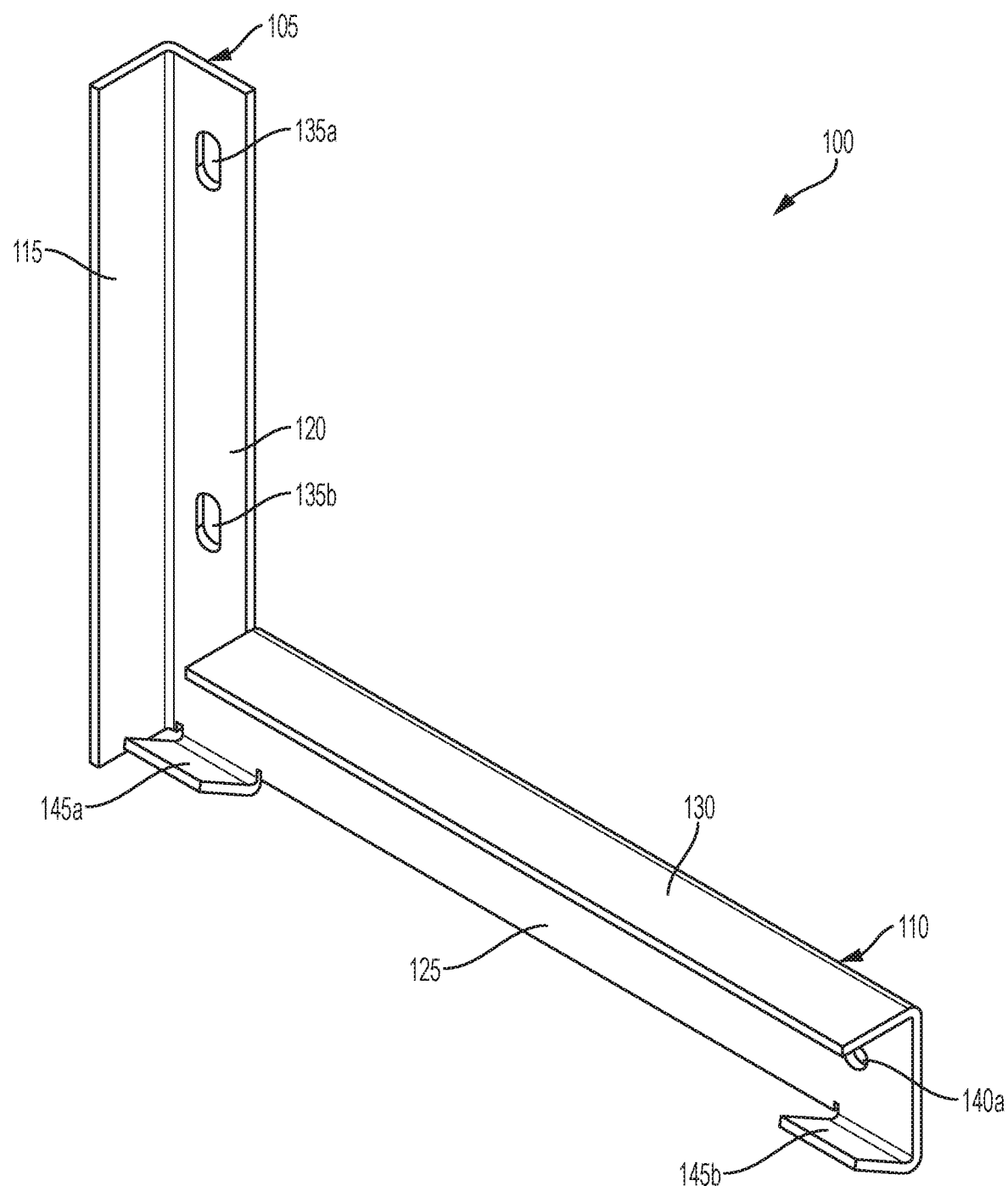
FIG. 1 is a front perspective view of a bracket according to at least some of the presently disclosed embodiments.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the terms "present invention" and "presently disclosed embodiments" are not intended to limit the scope of the claimed invention and is instead a term used to discuss exemplary embodiments of the invention for explanatory purposes only.

The presently disclosed embodiments include a bracket that couples a pegboard to a table. The bracket allows the pegboard to be attached to the table without requiring a different table for a pegboard table as compared to a non-pegboard table. The bracket can include horizontal and vertical portions that couple to the table and pegboard, respectively, and can also include tabs that grip the table or pegboard for additional structural support. The bracket therefore allows for a table to be sold with a pegboard, or for the same table to be sold without the pegboard, therefore freeing substantial inventory by allowing a single table for both the pegboard and non-pegboard options.

As shown, FIGS. 1-4 illustrate a bracket 100 with a vertical portion 105 and a horizontal portion 110. The vertical portion 105 can include a vertical base 115 and a vertical attachment portion 120 that couples to a pegboard, while the horizontal portion 110 can include a horizontal attachment portion 125 and a horizontal base 130 that couple to a work table. The vertical portion 105 can further include vertical openings 135a, b that allow fasteners to be inserted therethrough to couple the vertical portion 105 to a pegboard or other structure. Similarly, the horizontal portion 110 can include one or more horizontal openings 140a, 140b that allows a fastener to couple the bracket 100 to a work table or other structure. The vertical 105 or horizontal 110 portions can also include tabs 145a, b, c that can be bent to grip the pegboard or table and provide additional structural stability.

Figure 2:
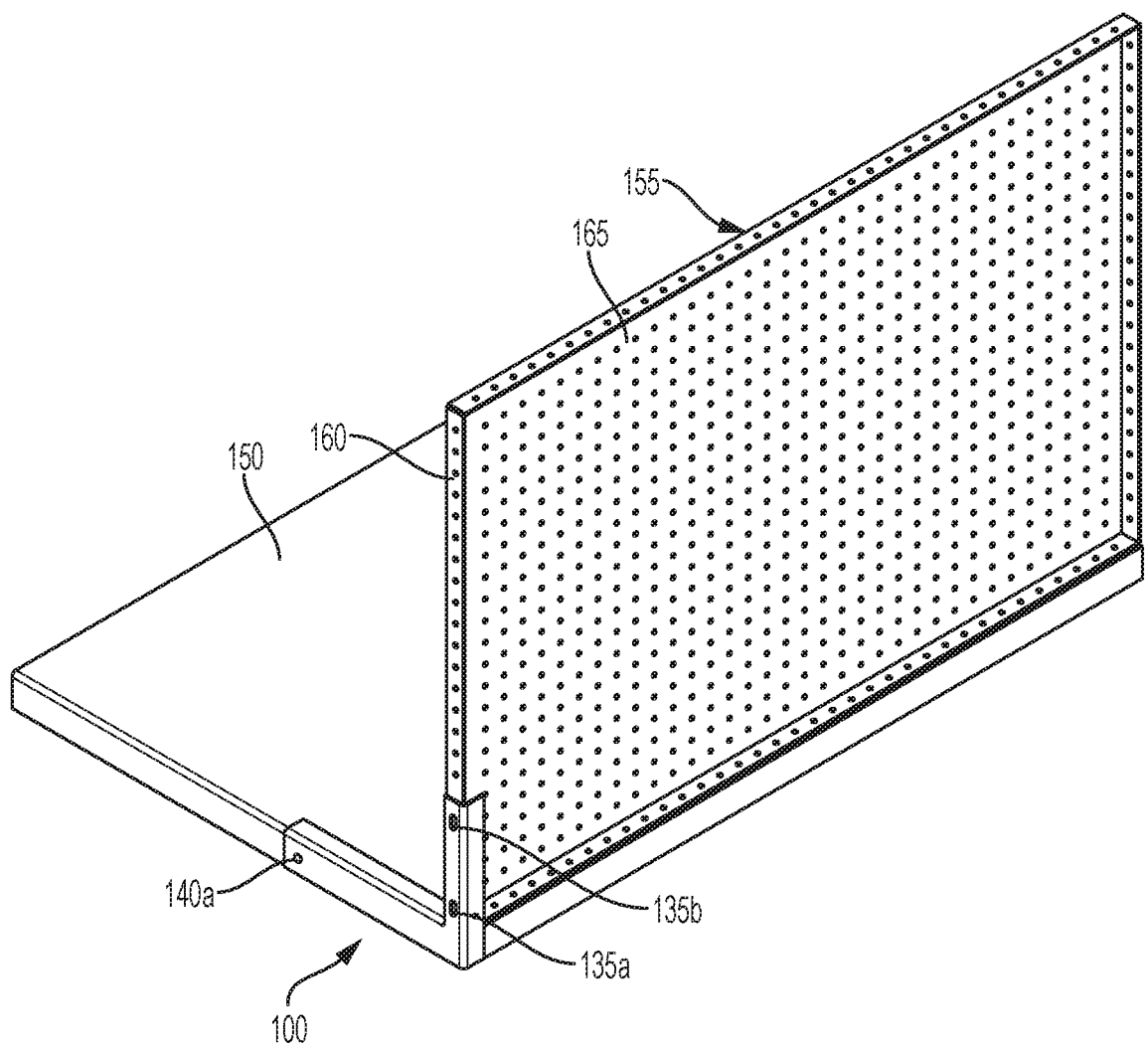
FIG. 2 is a rear perspective view of a bracket, table, and pegboard combination according to at least some of the presently disclosed embodiments.
Figure 3A:
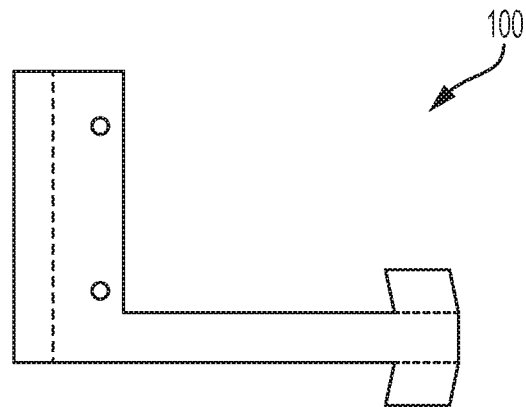
FIG. 3A is a side view of a bracket according to at least some of the presently disclosed embodiments.
Figure 3B:
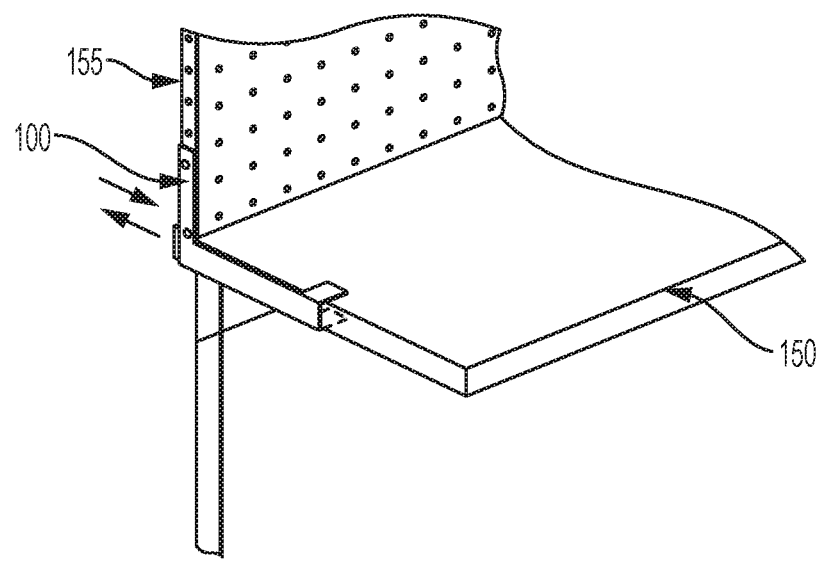
FIG. 3B is a front perspective view of a bracket, table, and pegboard combination according to at least some of the presently disclosed embodiments.

As shown in FIGS. 2, 3A, and 3B, the bracket 100 can couple to a tabletop 150 and further to a pegboard 155 or other structure. For example, the bracket 100 can couple to the pegboard 155 by having fasteners inserted through the vertical openings 135a, b and further inserted into side holes 160 of the pegboard 155. The pegboard can further include front holes 165 where a user can insert organization accessories, such as a hook, to manage and organize tools, fasteners, or other elements. As shown in, for example, FIGS. 3A and 4, the bracket 100 can be a single piece of bendable sheet metal that is bent to its intended three-dimensional configuration for coupling purposes.

The vertical portion 105 can be sized and shaped to couple to the pegboard 155. For example, the vertical base 115 can provide a structural backing for the rear of the pegboard 155, and the vertical attachment section 120 can couple to the pegboard 155 via the vertical openings 135a, b. Similarly, the horizontal portion 110 can be sized and shaped to couple to the table 150. For example, the horizontal base 130 can rest against and be parallel to the top surface of the table 150 to provide structural rigidity to the coupling of the table 150 and bracket 100. The tabs 145a, b can grip the underside of the table 150 for additional support. As shown, the horizontal portion 110 includes the tabs 145a, b. However, the vertical portion 105 can also include tabs 145a, b, or neither portion 105, 110 can include tabs, within the spirit and scope of the presently disclosed embodiments. Further, the number of tabs need not be two, or three, as shown, and can be any number.

Figure 4:
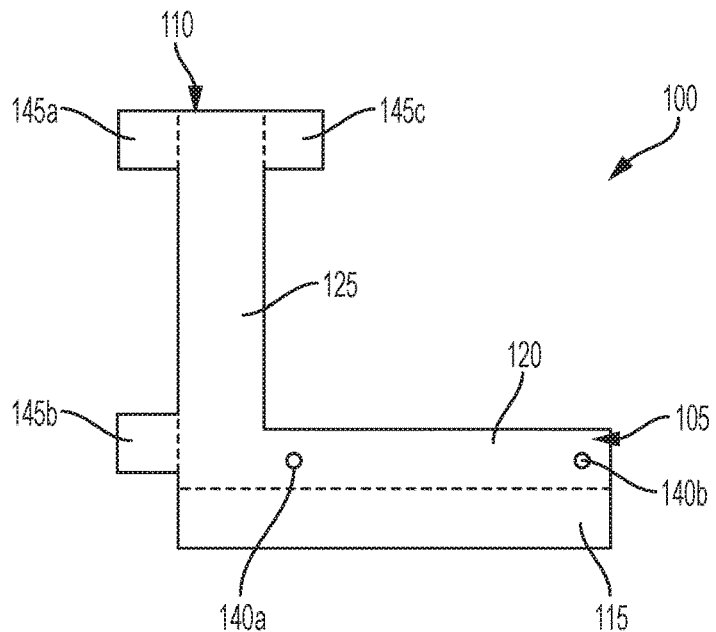
FIG. 4 is a front view of a bracket according to at least some of the presently disclosed embodiments.
Figure 5:
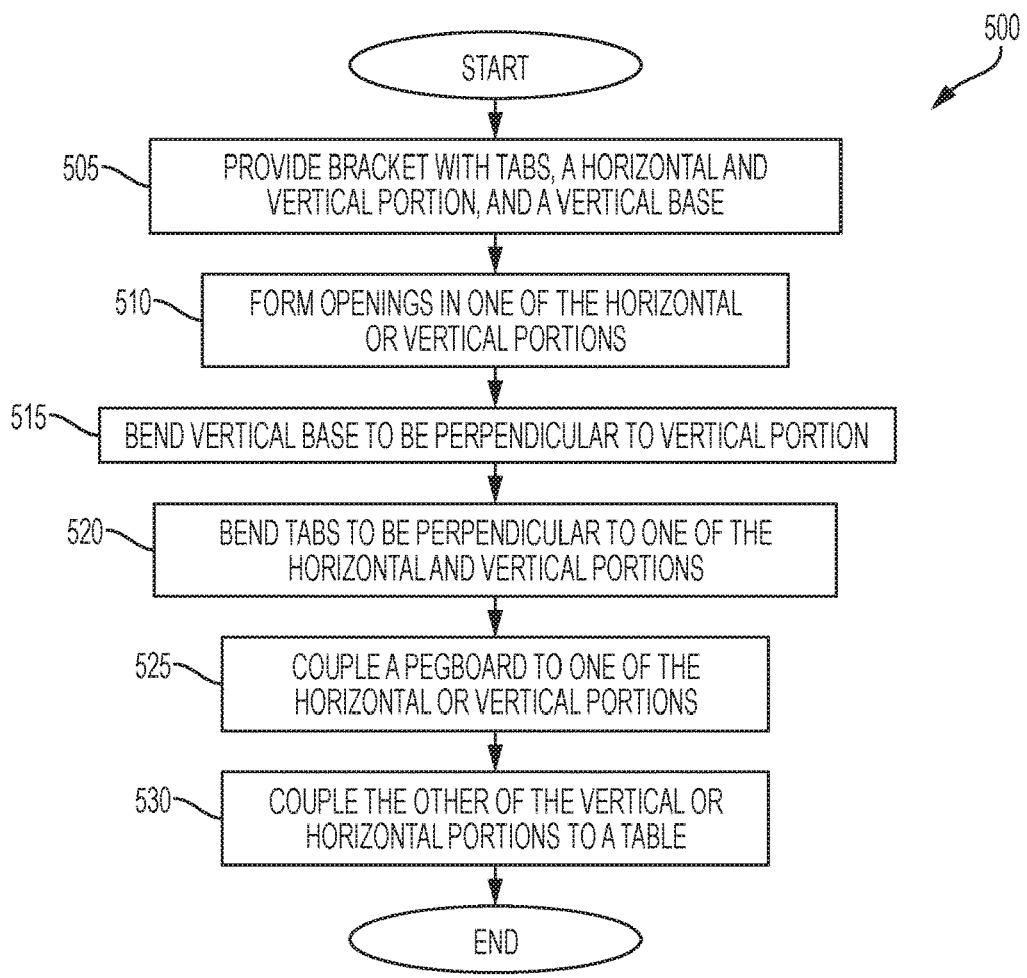
FIG. 5 is a flowchart illustrating a method of assembling a pegboard bracket to a pegboard and table according to at least some of the presently disclosed embodiments.

A method 500 of manufacturing the bracket 100 will now be described with reference to FIGS. 4 and 5. As shown, the method 500 begins and proceeds to step 505, where a bracket is provided with tabs 145 a, b, c, a vertical 105 and horizontal 110 portion, and a vertical base 115 coupled to the vertical portion 105. For example, the bracket 100 can be provided in a planar, sheet metal arrangement such as the raw bracket 100 shown in FIG. 4. In this manner, the bracket 100 can be bent or otherwise deformed to form a bracket shape and provide the advantages described above.

The method 500 then proceeds to step 510, where openings 140a, b are formed in one of the vertical 105 or horizontal 110 portions. These openings 140a, b can be for receiving fasteners to couple the bracket 100 to at least one of a pegboard 155 or a tabletop 150.

In step 515, the method 500 can then include bending or otherwise adjusting (collectively "deforming") the vertical base 115 so that the vertical base 115 is perpendicular to the vertical portion 105 and so that the vertical base 115 and vertical attachment portion 120 at least partially surround the pegboard 155 or tabletop 150 on at least two sides. In so doing, the vertical base 115 can provide a surface on which either the tabletop 150 or the pegboard 155 can be received within for additional structural stability. In step 520, the tabs 145 a, b, c can be deformed, similar to the vertical base 115, to provide additional structural stability to the tabletop 150 or pegboard 155 (whichever will not be coupled to the vertical base 115). As used herein, the term "perpendicular" is not necessarily intended to mean exactly perpendicular, but rather what one of ordinary skill would consider "perpendicular" within acceptable tolerances in the industry.

The pegboard 155 can then be coupled to either the vertical 105 or horizontal 110 portion in step 525. For example, the pegboard 155 can rest against the vertical base 115 and receive the fasteners that insert through the openings 140 a, b if the pegboard 155 is to be coupled to the vertical portion 105, or the pegboard 155 can rest against the tabs 145a, b, c and be held therein by a tensile force, and/or by other fasteners, if the pegboard 155 is to be coupled to the horizontal portion 110. In step 530, the tabletop 150 can implement the same process with the vertical 105 or horizontal portion 110 that the pegboard 155 did not couple to. After step 530, the method 500 ends.

The method 500 discussed above is not limited in its order of processes and can be implemented in any logical order. For example, the tabs 140a, b, c can be deformed last to provide a better force against the vertical 105 or horizontal 110 portion, or can be deformed so as to provide a barrier for the tabletop 150 or pegboard 155 from moving without providing a tensile force on the tabletop 150 or pegboard 155. The vertical base 115 can likewise be deformed at any time, or the openings 140a, b be formed at any time prior to fasteners being inserted therethrough.

As discussed herein, the bracket 100 includes a vertical portion 105 and a horizontal portion 110. However, the terms "vertical" and "horizontal" are exemplary only and, in certain embodiments, are not intended to limit the bracket 100 to any geographic orientation, other than to describe the vertical direction as being perpendicular to the horizontal direction.

The presently disclosed embodiments provide for a bracket that couples a table to a pegboard or other structure. The bracket does so without requiring a different table for a stand-alone table as compared to a table having a pegboard. The bracket therefore reduces inventory and lowers cost for companies selling tables with and without pegboards.

As discussed herein, the invention can be implemented as a bracket that couples a table and pegboard together. However, the bracket can be implemented in any form, and unless otherwise claimed below, should be understood to apply to coupling two or more of any object together, not necessarily a pegboard and table.

The term "fastener," as used herein, can apply to any known fastener, such as a screw, nail, bolt, adhesive, tape, clamp, or any other object capable of coupling two objects together.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims and when viewed in their proper perspective based on the prior art.

What is claimed is:

1. A combination comprising:
    a table;
    a pegboard;
    a bracket coupling the table to the pegboard and comprising:
        a vertical portion including:
            a vertical base having a minor side and a major side longer than the minor side, the major side of the vertical base extending in a first direction and the minor side of the vertical base extending in a second direction perpendicular to the first direction;
            a vertical attachment portion having a minor side and a major side longer than the minor side, the major side of the vertical attachment portion extending in the first direction parallel to the major side of the vertical base, and the minor side of the vertical attachment portion extending in a third direction perpendicular to both the first and second direction, the vertical attachment portion coupling to the pegboard; and
        a horizontal portion extending from the vertical portion and including:
            a horizontal attachment portion having a minor side and a major side longer than the minor side, the major side of the horizontal attachment portion extending in the third direction and the minor side of the horizontal attachment portion extending in the first direction;
            a horizontal base extending from the horizontal attachment portion and having a minor side and a major side longer than the minor side, the major side of the horizontal base extending in the third direction and the minor side of the horizontal base extending in the second direction; and
            tab extending from the horizontal attachment portion in the second direction and configured to bend upward to grip the table, the tab extending a distance shorter than the major side of the horizontal base and horizontal attachment portion,
            wherein the tab is located below the horizontal base on an opposite side of the horizontal attachment portion, the vertical base and vertical portion each extend upward away from the tab, and wherein the tab has a tab area facing the table and the horizontal base has a horizontal base area facing the table, and wherein the horizontal base area is larger than the tab area.

2. The combination of claim 1, wherein the bracket further comprises openings formed in at least one of the vertical portion and the horizontal portion and allowing a fastener to couple the horizontal portion to the table or the vertical portion to the pegboard.

3. The combination of claim 1, wherein the tab includes first and second tabs on opposite ends of the horizontal attachment portion.

* * * * *